(12) United States Patent
Berneth

(10) Patent No.: US 6,806,989 B2
(45) Date of Patent: Oct. 19, 2004

(54) ELECTROCHROMIC DEVICE AND NOVEL ELECTROCHROMIC COMPOUNDS

(75) Inventor: Horst Berneth, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 177 days.

(21) Appl. No.: 10/278,309

(22) Filed: Oct. 23, 2002

(65) Prior Publication Data

US 2003/0129368 A1 Jul. 10, 2003

(30) Foreign Application Priority Data

Oct. 26, 2001 (DE) ......................................... 101 52 988

(51) Int. Cl.[7] ........................... G02F 1/15; G02F 1/153; G02F 1/00
(52) U.S. Cl. ........................ 359/265; 359/267; 359/268; 359/275; 252/583
(58) Field of Search ................................ 359/265, 267, 359/268, 272, 275; 252/582, 583, 600; 544/347; 546/257; 204/290.07; 428/426, 427, 583

(56) References Cited

U.S. PATENT DOCUMENTS

| | | | |
|---|---|---|---|
| 3,280,701 A | | 10/1966 | Donnelly ........................ 88/77 |
| 4,285,575 A | * | 8/1981 | Imataki et al. ............... 359/273 |
| 4,902,108 A | | 2/1990 | Byker ........................ 350/357 |
| 5,140,455 A | | 8/1992 | Varaprasad et al. .......... 359/275 |
| 5,151,816 A | | 9/1992 | Varaprasad et al. .......... 359/275 |
| 5,457,564 A | | 10/1995 | Leventis et al. ............. 359/271 |
| 6,193,912 B1 | * | 2/2001 | Thieste et al. ............... 252/583 |
| 6,207,292 B1 | | 3/2001 | Berneth et al. ............. 428/583 |
| 6,241,916 B1 | | 6/2001 | Claussen et al. ............. 252/583 |
| 6,417,951 B1 | * | 7/2002 | Berneth et al. ............. 359/265 |

OTHER PUBLICATIONS

Topics in Current Chemistry, vol. 92, (month unavailable) 1980, pp. 1–4, Siegfried Hünig and Horst Berneth, "Two Step Reversible Redox Systems of the Weitz Type".

Ullmanns Encyc. of Industrial Chem. vol. A8, (month unavailable) 1987, pp. 622–623, "Display Technology".

Electrokhimiya, Apr. 13, 1977, pp. 404–408, O.S. Abramzon et al, "Moisture–Excange Processes in Hydrogenoxygen Cells with Capillary Membrane".

Just Liebigs Ann. Chem. 609, (month unavailable) 1957, pp. 172–180, Siegfried Hünig und Karl Herbert Fritsch, "Azofarbstroffe Durch Oxydative Kupplung".

J. Chem. Soc. 123 (month unavailable) 1923, p. 2361, "Studies in the Benzothiazole Series".

J. Chem. Soc. Perkin Trans. 1 (month unavailable) 1974, pp. 1422–1427, Roger W. Baldock t al, "Stable Free Radicals, Part 1, A New Principle governing the Stability of Organic Free Radicals".

* cited by examiner

Primary Examiner—Georgia Epps
Assistant Examiner—William Choi
(74) Attorney, Agent, or Firm—Jill Denesvich; Godfried R. Akorli

(57) ABSTRACT

Asymmetrical compounds composed of two different heterocyclic and/or carbocyclic rings linked via a conjugated chain containing an uneven number of chain atoms are useful electrochromic compounds and can be used for producing electrochromic devices.

16 Claims, 1 Drawing Sheet

ELECTROCHROMIC DEVICE AND NOVEL ELECTROCHROMIC COMPOUNDS

BACKGROUND

The invention relates to novel electrochromic compounds, their use for elecrochromic devices and electrochromic devices containing these electrochromic compounds.

Electrochromic compounds are already known. See Topics in Current Chemistry, vol. 92, pp. 1–44, (1980), U.S. Pat. No. 4,902,108, WO 97/30134.

A common feature of most of these compounds is their symmetrical structure, for example, two identical rings are optionally linked to one another via a conjugated chain containing an even number of chain atoms or two identical heteroatoms are linked to one another via a conjugated chain or an aromatic or quinoid ring or form part of a heterocycle. This is illustrated by the examples below:

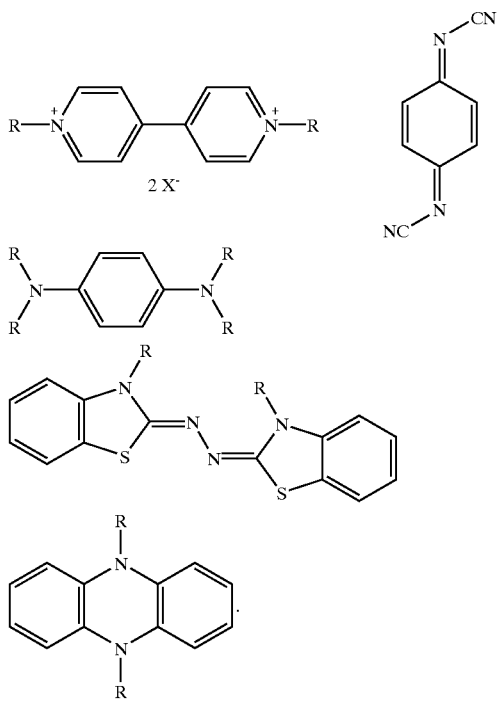

In these formulae, R is a group such as an alkyl radical.

JP 60-223 886 describes the use of azines, for example of the formula

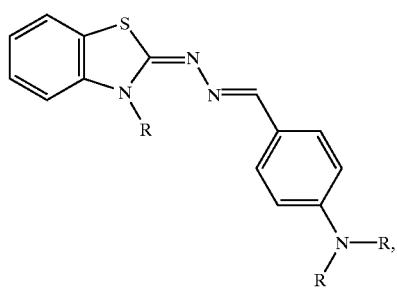

in which R is a group such as alkyl, in an electrochromic display device. However, only one compound of this type is used as electrochromic compound in the device (corresponding to $RED_1$) which involves the known disadvantages of high operating voltage and poor durability.

Electrochromic devices are already known. See D. Theis in Ullmann's Encyclopaedia of Industrial Chemistry, vol. A 8, p. 622, Verlag Chemie 1987 and WO-A 94/23333. A distinction is made between two basic types:

Type 1: full-area electrochromic device.
Type 2: electrochromic display devices having structured electrodes.

Type 1 is used, for example, in electrically darkenable window panes or electrically dimmable automobile mirrors. Such devices are disclosed, for example, in U.S. Pat. No. 4,902,108.

Type 2 is used in segment and matrix displays. Such display devices are proposed, for example, in DE-A 196 31 728. Devices of this type can be observed transmissively or, in the case of a mirror coating, reflectively.

WO-A 94/23333 compares electrochromic materials having different constructions, but these are not used as display devices:

Construction a: the electrochromic substances are in the form of a fixed film or layer on the electrodes (Ullmann, see above).

Construction b: the electrochromic substances are deposited on the electrodes as a layer by the redox process (Ullmann, see above).

Construction c: the electrochromic substances remain permanently in solution.

For construction a), the best-known electrochromic material is the tungsten oxide/palladium hydride pair.

For construction b), viologens have been described as electrochromic substances. These devices are not self-erasing, i.e. the image produced remains after the current has been switched off and can only be erased again by reversing the voltage. Such devices are not particularly stable and do not allow a large number of switching cycles.

In addition, such cells constructed using tungsten oxide/palladium hydride in particular cannot be operated in transmitted light, but only reflectively, owing to light scattering at these electrochromic layers.

Elektrokhimiya 13, 404–408, U.S. Pat. No. 4,902,108 and U.S. Pat. No. 5,140,455 disclose an electrochromic system of the latter construction c). An electrochromic cell which is constructed from glass plates with a conductive coating includes a solution of a pair of electrochromic substances in an inert solvent.

The pair of electrochromic substances used is one electrochemically reversibly reducible substance and one reversibly oxidizable substance. Both substances are colorless or only weakly colored in the ground state. Under the action of an electric voltage, one substance is reduced and the other oxidized, both becoming colored. When the voltage is switched off, the ground state re-forms in the case of both substances, resulting in disappearance or fading of the color.

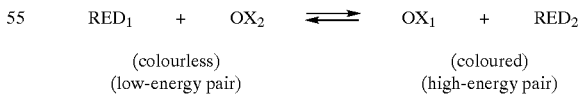

U.S. Pat. No. 4,902,108 discloses that suitable pairs of redox substances are those in which the reducible substance has at least two chemically reversible reduction waves in the cyclic voltammogram and the oxidizable substance correspondingly has at least two chemically reversible oxidation waves.

Various applications have been described for electrochromic cells of construction c). For example, they can be formed as automobile rear-view mirrors which can be darkened during night driving by application of a voltage and thus prevent dazzling by the headlamps of following vehicles (U.S. Pat. No. 3,280,701, U.S. Pat. No. 4,902,108 and EP-A 0 435 689). Furthermore, such cells can also be employed in window panes or automobile sunroofs, where they darken the sunlight after application of a voltage. Likewise described is the use of such devices as electrochromic display devices, for example in segment or matrix displays having structured electrodes (DE-A 196 31 728).

The electrochromic cells normally consist of a pair of glass plates, of which, in the case of the automobile mirror, one is mirrored. One side of these plates is coated over its surface with a light-transparent, electroconductive layer, for example indium-tin oxide (ITO), and in the case of display devices this conductive coating is divided into electrically separated segments provided with individual contacts. These plates are used to construct a cell by joining them by means of a sealing ring with their electroconductively coated sides facing one another to form a cell. This cell is filled with an electrochromic liquid via an opening, and the cell is tightly sealed. The two plates are connected to a voltage source via the ITO layers.

It has now been found that asymmetrical compounds composed of two different heterocyclic and/or carbocyclic rings linked via a conjugated chain containing an uneven number of chain atoms are likewise useful electrochromic compounds

SUMMARY

The invention relates to an electrochromic device comprising (a) a pair of glass plates or a pair of plastic plates or a pair of plastic films, wherein (A) both plates or both films are transparent and at least one plate has a side with a transparent electrically conductive coating that is optionally divisible into separate, individually contacted area segments or (B) (i) one plate or one film is transparent, (ii) the other plate or film is mirrored and (iii) at least one plate or at least one film has a transparent, electrically conductive coating that is optionally divisible into separate, individually contacted area segments and, (b) a sealing ring for joining together the plates or the films on the sides having an conductive coating, wherein the two plates or films and the sealing ring form a volume, and (c) an electrochromic medium for filling the volume, wherein the electrochromic medium includes at least one oxidizable electrochromic substance $RED_1$ and at least one reducible electrochromic substance $OX_2$, wherein the substance $RED_1$ is an electrochromic compound of the formula (CC):

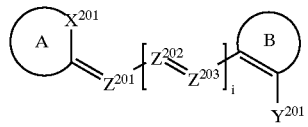

(CC), wherein

A is an aromatic or a quasi-aromatic, heterocyclic 5- or 6-membered ring in which $X^{201}$ is located in the 2- or 4-position relative to the point of attachment, B is an aromatic or a quasi-aromatic, carbocyclic or heterocyclic 5- or 6-membered ring in which $Y^{201}$ is located in the 2- or 4-position relative to the point of attachment, $X^{201}$ is $NR^{201}$, O or S, $Y^{201}$ is $NR^{202}R^{203}$, $OR^{204}$ or $SR^{205}$, $Z^{201}$ to $Z^{203}$, independently of one another, are carbon or nitrogen, $R^{201}$ to $R^{205}$, independently of one another, are alkyl, alkenyl, cycloalkyl, aralkyl or aryl, and $R^{202}$ to $R^{205}$ may additionally be hydrogen, i is an integer from 0 to 3, and $Z^{201}$ to $Z^{203}$ may form a bridge with one another or with the rings A and/or B, and/or the substance $OX_2$ used is an electrochromic compound of the formula (CCl):

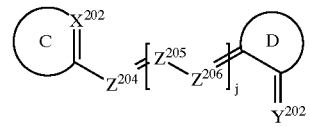

(CCl), in which

C is an aromatic or a quasi-aromatic, heterocyclic 5- or 6-membered ring in which $X^{202}$ is located in the 2- or 4-position relative to the point of attachment, D is an aromatic or a quasi-aromatic, carbocyclic or heterocyclic 5- or 6-membered ring in which $Y^{202}$ is located in the 2- or 4-position relative to the point of attachment, or

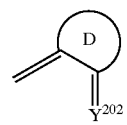

is $=C(CN)_2$, $=C(CN)COOalkyl$ or $=C(COOalkyl)_2$, $X^{202}$ is $N^+R^{206}$, $O^+$ or $S^+$, $Y^{202}$ is $NR^{207}$, O, S, N—CN or $C(CN)_2$, $Z^{204}$ to $Z^{206}$, independently of one another, are carbon or nitrogen, $R^{206}$ and $R^{207}$, independently of one another, are alkyl, alkenyl, cycloalkyl, aralkyl or aryl, j is an integer from 0 to 3, and $Z^{204}$ to $Z^{206}$ may form a bridge with one another or with the rings C and/or D, where the rings A, B, C and D may carry further substituents.

The invention also relates to an electrochromic compound of the formula (CC).

The invention also relates to an electrochromic compound of the formula (L)

$$Y-[-(-B-Z-)_a-(-B-Y-)_b-]_c-B-Z \qquad (L),$$

wherein Y and Z, independently of one another, are an $OX_2$ or $RED_1$ radical with the proviso that at least one Y is $OX_2$ and at least one Z is $RED_1$ or Y and Z are $OX_2$, wherein $OX_2$ is the radical of a reversibly electrochemically reducible redox system, and $RED_1$ is the radical of a reversibly electrochemically oxidizable redox system, B is a bridging unit, c is an integer from 0 to 1000, and a and b, independently of one another, are integers from 0 to 100, wherein at least one $OX_2$ corresponds to a radical of the formula (CCl) and/or at least one $RED_1$ corresponds to a radical of the formula (CC).

DESCRIPTION OF THE FIGURES

These and other features, aspects, and advantages of the present invention will become better understood with reference to the following description and appended claims, where:

DESCRIPTION OF THE INVENTION

Figure 1:
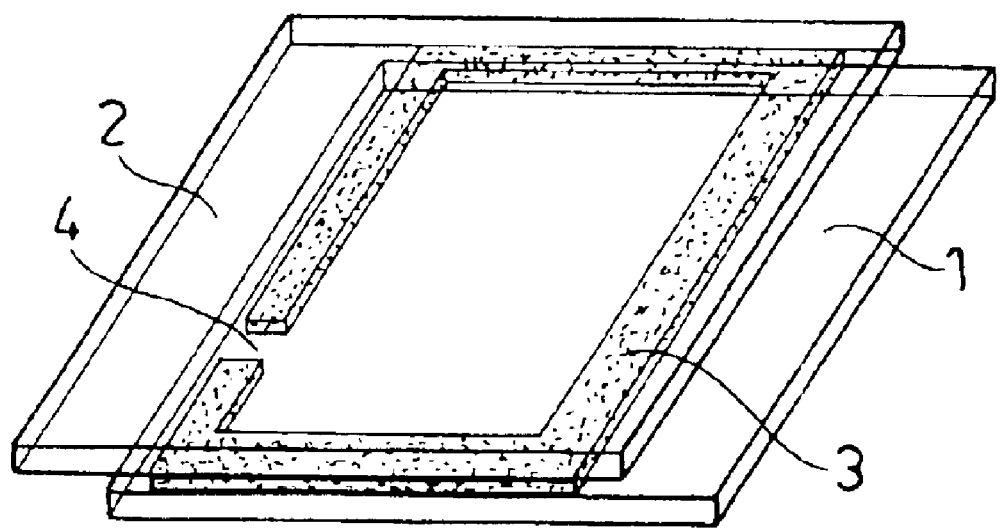
FIG. 1 shows a cell made in accordance with the invention.

The invention accordingly provides an electrochromic device containing at least one of these asymmetrical electrochromic compounds and these electrochromic compounds themselves.

The invention provides an electrochromic device comprising a pair of glass or plastic plates or plastic films of which at least one plate or film, preferably both plates or films, are provided on in each case one side with an electrically conductive coating, of which at least one plate or film and its conductive coating are transparent, of which the other may be mirrored, and of which in the case of at least one of the two plates or films the electrically conductive layer can be divided into separate, individually contacted area segments. The plates or films are joined together via a sealing ring on the sides of their conductive coating, and the volume formed by the two plates or films and the sealing ring is filled with an electrochromic medium which includes at least one oxidizable electrochromic substance RED, and at least one reducible electrochromic substance $OX_2$. The substance $RED_1$ used is an electrochromic compound of the formula (CC)

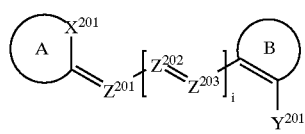

(CC), in which

A is an aromatic or a quasi-aromatic, heterocyclic 5- or 6-membered ring in which $X^{201}$ is located in the 2- or 4-position relative to the point of attachment, B is an aromatic or a quasi-aromatic, carbocyclic or heterocyclic 5- or 6-membered ring in which $Y^{201}$ is located in the 2- or 4-position relative to the point of attachment, $X^{201}$ is $NR^{201}$, O or S, $Y^{201}$ is $NR^{202}R^{203}$, $OR^{204}$ or $SR^{205}$, $Z^{201}$ to $Z^{203}$, independently of one another, are carbon or nitrogen, $R^{201}$ to $R^{205}$, independently of one another, are alkyl, alkenyl, cycloalkyl, aralkyl or aryl, and $R^{202}$ to $R^{205}$ may additionally be hydrogen, i is an integer from 0 to 3, and $Z^{201}$ to $Z^{203}$ may form a bridge with one another or with the rings A and/or B, and/or the substance $OX_2$ used is an electrochromic compound of the formula (CCl)

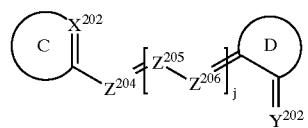

(CCl), in which

C is an aromatic or a quasi-aromatic, heterocyclic 5- or 6-membered ring in which $X^{202}$ is located in the 2- or 4-position relative to the point of attachment, D is an aromatic or a quasi-aromatic, carbocyclic or heterocyclic 5- or 6-membered ring in which $Y^{202}$ is located in the 2- or 4-position relative to the point of attachment, or

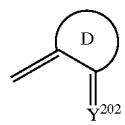

is $=C(CN)_2$, $=C(CN)COOalkyl$ or $=C(COOalkyl)_2$, $X^{202}$ is $N^+R^{206}$, $O^+$ or $S^+$, $Y^{202}$ is $NR^{207}$, O, S, N—CN or $C(CN)_2$, $Z^{204}$ to $Z^{206}$, independently of one another, are carbon or nitrogen, $R^{206}$ and $R^{207}$, independently of one another, are alkyl, alkenyl, cycloalkyl, aralkyl or aryl, j is an integer from 0 to 3, and $Z^{204}$ to $Z^{206}$ may form a bridge with one another or with the rings C and/or D, where the rings A, B, C and D may carry further substituents.

Preference is given to an electrochromic device of this type, wherein

A is an optionally benzo-fused pyrroline, pyrazoline, imidazoline, triazoline, oxazoline, thiazoline, oxadiazoline, thiadiazoline, dithioline, dihydropyridine, dihydropyrimidine or dihydropyrazine ring, B is an optionally benzo-fused cyclopentadiene or benzene ring, $X^{201}$ is $NR^{201}$, $Y^{201}$ is $NR^{202}R^{203}$, $OR^{204}$ or $SR^{205}$ and is located in the 2- or 4-position relative to the point of attachment, $Z^{201}$ to $Z^{203}$, independently of one another, are carbon or nitrogen, $R^{201}$ to $R^{205}$, independently of one another, are $C_1$- to $C_{12}$-alkyl, $C_3$- to $C_7$-cycloalkyl, $C_7$- to $C_{15}$-aralkyl or $C_6$- to $C_{10}$-aryl, and $R^{202}$ to $R^{205}$ may additionally be hydrogen, i is 0 or 1, and $(Z^{202}=Z^{203})_i$ may be phenylene, C is an optionally benzo-fused pyrrole, pyrazole, imidazole, triazole, oxazole, thiazole, oxadiazole, thiadiazole, dithiol, pyridine, pyrimidine or pyrazine ring, D is an optionally benzo-fused cyclopentene or benzoquinoid ring, or

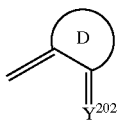

is =C(CN)$_2$,

X$^{202}$ is N$^+$R$^{206}$, O$^+$ or S$^+$,

Y$^{202}$ is NR$^{207}$, O, S, N—CN or C(CN)$_2$ and is located in the 2- or 4-position relative to the point of attachment, Z$^{204}$ to Z$^{206}$, independently of one another, are carbon or nitrogen, R$^{206}$ and R$^{207}$, independently of one another, are C$_1$- to C$_{12}$-alkyl, C$_3$- to C$_7$-cycloalkyl, C$_7$- to C$_{15}$-aralkyl or C$_6$- to C$_{10}$-aryl, j is an integer from 0 to 3, and (Z$^{205}$=Z$^{206}$)$_j$ may be phenylene.

Particularly preferably, the atoms X$^{201}$ and Y$^{201}$ and X$^{202}$ and Y$^{202}$ are separated by no more than 8 atoms, very particularly preferably by no more than 6 atoms.

The rings A, B, C and D and all other radicals may carry further substituents, e.g., C$_1$- to C$_6$-alkyl, C$_1$- to C$_6$-alkoxy, fluorine, chlorine, bromine, cyano, hydroxyl, C$_1$- to C$_6$-alkoxycarbonyl or nitro. It also possible for two adjacent radicals to form a ring. If the chain members Z$^{201}$ to Z$^{206}$ are C, they may be substituted by C$_1$- to C$_6$-alkyl or cyano, for example.

In the substituent definitions given above, alkyl radicals, including derivatives, for example alkoxy or aralkyl radicals, are preferably those having 1 to 12 carbon atoms, in particular having 1 to 8 carbon atoms, unless stated otherwise. They can be straight-chain or branched and can optionally carry further substituents, such as C$_1$- to C$_4$-alkoxy, fluorine, chlorine, hydroxyl, cyano, C$_1$- to C$_4$-alkoxycarbonyl or COOH.

The term cycloalkyl radicals is preferably taken to mean those having 3 to 7 carbon atoms, in particular having 5 or 6 carbon atoms.

Alkenyl radicals are preferably those having from 2 to 8 carbon atoms, in particular 2 to 4 carbon atoms.

Aryl radicals, including those in aralkyl radicals, are phenyl or naphthyl radicals, in particular phenyl radicals. They can be substituted by 1 to 3 of the following radicals: C$_1$- to C$_6$-alkyl, C$_1$- to C$_6$-alkoxy, fluorine, chlorine, bromine, cyano, hydroxyl, C$_1$- to C$_6$-alkoxycarbonyl or nitro. Two adjacent radicals can also form a ring.

Very particular preference is given to an electrochromic device in which

A is an indoline, benzimidazoline, benzoxazoline, benzthiazoline, 1,3-dithioline, dihydropyridine or dihydroquinoline radical, B is an indene or a benzene ring, X$^{201}$ is NR$^{201}$ or S, Y$^{201}$ is NR$^{202}$R$^{203}$ or OR$^{204}$ and is located in the 2-position relative to the point of attachment when B is an indene ring, and is located in the 4-position relative to the point of attachment when B is a benzene ring, Z$^{201}$—(Z$^{202}$=Z$^{203}$)$_i$ is N, CH, CH—N=N,N—N=CH, CH—CH=CH or N—N=N, R$^{201}$ to R$^{204}$, independently of one another, are methyl, ethyl, propyl, butyl, pentyl, hexyl, heptyl, octyl, cyclohexyl, benzyl, phenethyl, phenylpropyl or phenyl, C is a benzimidazole, benzoxazole, benzthiazole, 1,3-dithiol, pyridine or quinoline ring, D is an indane or benzoquinoid ring, X$^{202}$ is N$^+$R$^{206}$ or S$^+$, Y$^{202}$ is O, N—CN or C(CN)$_2$, Z$^{204}$=(Z$^{205}$—Z$^{206}$) is N or CH, and R$^{206}$ is methyl, ethyl, propyl, butyl, pentyl, hexyl, heptyl, octyl, cyclohexyl, benzyl, phenethyl, phenylpropyl or phenyl.

Preferred rings A are:

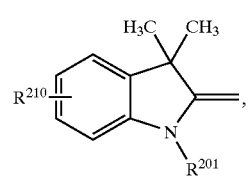

(CCX)

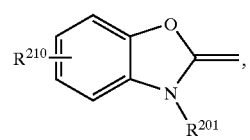

(CCXI)

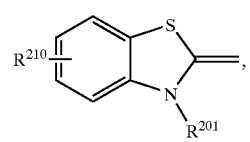

(CCXII)

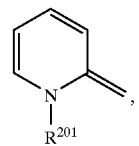

(CCXIII)

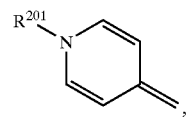

(CCXIV)

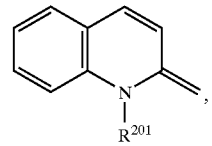

(CCXV)

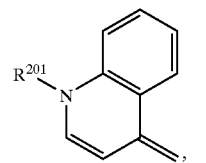

(CCXVI)

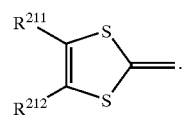

(CCXVII)

Preferred rings B are:
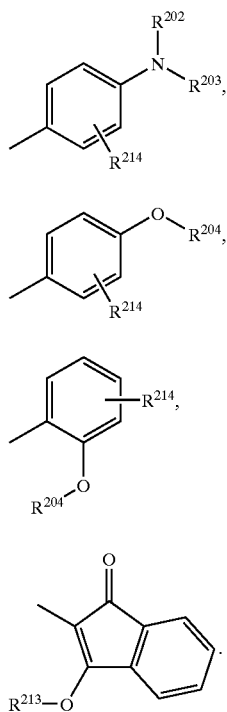
Preferred rings C are:
(CCXVIII)
(CCXIX)
(CCXX)
(CCXXI)
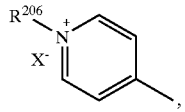
(CCXXVII)
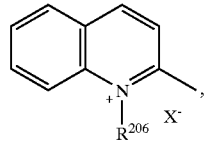
(CCXXVIII)
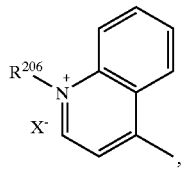
(CCXXIX)
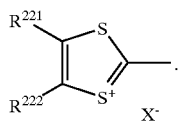
(CCXXX)
Preferred rings D are:
(CCXXII)
(CCXXIII)
(CCXXIV)
(CCXXV)
(CCXXVI)
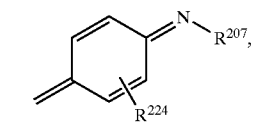
(CCXXXI)
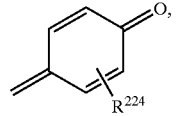
(CCXXXII)
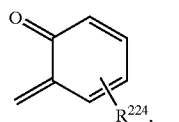
(CCXXXIII)
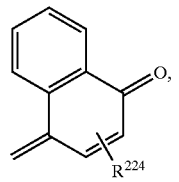
(CCXXXIV)
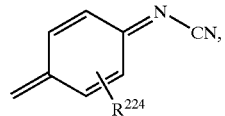
(CCXXXV)
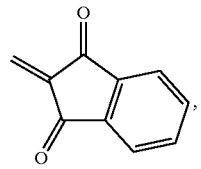
(CCXXXVI)

-continued

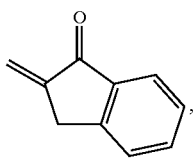
(CCXXXVII)

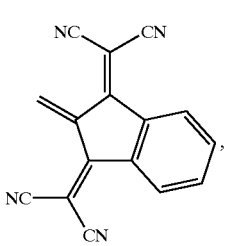
(CCXXXVIII)

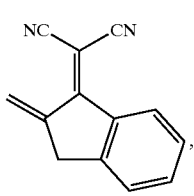
(CCXXXIX)

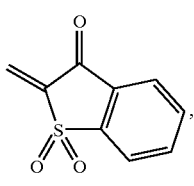
(CCXL)

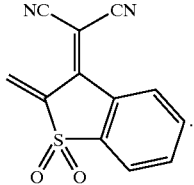
(CCXLI)

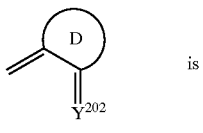 is additionally

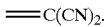
=C(CN)$_2$.
(CCXLII)

In these formulae,
$R^{210}$ and $R^{220}$ are H, Cl, CH$_3$, OCH$_3$, COOCH$_3$,
$R^{211}$, $R^{212}$, $R^{221}$ and $R^{222}$ are H, CH$_3$, COOCH$_3$, SCH$_3$,
$R^{213}$ is CH$_3$, C$_2$H$_5$,
$R^{214}$ and $R^{224}$ are H, Cl, CH$_3$, OCH$_3$, NHCOCH$_3$,
X$^-$ is an anion and
$R^{201}$ to $R^{203}$, $R^{206}$ and $R^{207}$ are as defined above in general, preferred, particularly preferred and very particularly preferred terms.

Particularly preferred rings A are those of the formulae (CCX), (CCXII), (CCXIV), (CCXVI) and (CCXVII), in which $R^{210}$ is located in p position relative to N—$R^{201}$ and $R^{201}$, $R^{210}$ to $R^{212}$ are as defined above.

Particularly preferred rings B are those of the formulae (CCXVIII), (CCXIX) and (CCXXI), in which $R^{214}$ is located in m position relative to NR$^{202}$R$^{203}$ or OR$^{204}$ and $R^{202}$ to $R^{204}$, $R^{213}$ and $R^{214}$ are as defined above.

Particularly preferred rings C are those of the formulae (CCXXII), (CCXXIV), (CCXXVII), (CCXXIX) and (XXCCC), in which $R^{220}$ is located in p position relative to N—$R^{206}$ and $R^{206}$ $R^{220}$ to $R^{222}$ and X$^-$ are as defined above.

Particularly preferred rings D are those of the formulae (CCXXXI), (CCXXXII), (CCXXXVI), (CCXXXVII), (CCXXXIX) and (CCXLII), in which $R^{224}$ is located in m position relative to =NR$^{207}$ or =O steht and $R^{207}$ and $R^{224}$ are as defined above.

The electrochromic compounds RED$_1$ of the formula (CC) and OX$_2$ of the formula (CCI) according to the invention usually exhibit two chemically reversible stages in the cyclic voltammogram. On oxidation or reduction at the anode or cathode, they give products OX$_1$ and RED$_2$ which do not undergo any subsequent chemical reaction, but instead can be fully oxidized or reduced back to RED$_1$ and OX$_2$. Their oxidation or reduction is associated with a change in their absorption in the visible part of the spectrum. For example, a colorless or weakly colored RED$_1$ is converted into a colored OX$_1$ or, for example, RED$_1$ and OX$_1$ are both colored, but have different colors, e.g. yellow and blue. In addition to these absorptions in the visible part of the spectrum, absorptions in the near infrared may also occur.

In addition to these electrochromic compounds RED$_1$ and/or OX$_2$ according to the invention, the electrochromic device according to the invention contains, if desired, further known electrochromic compounds so that it contains at least one oxidizable electrochromic compound RED$_1$ and at least one reducible electrochromic compound OX$_2$.

By selection of the electrochromic compounds RED, and OX$_2$ and/or mixtures thereof, any desired monochromic colors can be established. For a polychromic color display, two or more such electrochromic devices can be placed flat one on top of the other, with each of these devices being capable of producing a different color. Such a stack is preferably built up in such a way that the devices in contact with one another have a common light-transparent plate, which is then provided with a conductive coating on both sides and, depending on the design, divided into segments. A stack then consists, for example, of three electrochromic devices consisting of at least four plates. By switching on segments in various of these stacked devices, multicolored displays can be achieved. If consecutive segments in different devices of this kind are switched on, mixed colors are obtained. Thus, any desired colors can be displayed in the context of trichromicity, i.e., for example, multicolored images.

Suitable other reducible electrochromic substances OX$_2$ and oxidizable electrochromic substances RED$_1$ are the following compounds, where a) the reducible substance has at least one, preferably at least two, chemically reversible reduction waves in the cyclic voltammogram and the oxidizable substance correspondingly has at least one, preferably at least two, chemically reversible oxidation waves, or b) the reducible substance and the oxidizable substance are covalently bonded to one another via a bridge B, or c) the reducible and/or oxidizable substances selected are those in which the reversible transition between the oxidizable form and the reducible form or vice versa is associated with the breaking or forming of a σ bond, or d) the reducible substance and/or the oxidizable substance are metal salts or metal complexes of those metals which exist in at least two oxidation states, or e) the reducible and/or oxidizable substances are oligomers and polymers containing at least one of said redox systems, but also pairs of such redox systems as defined under a) to d).

Suitable OX$_2$ and RED$_1$ for the purposes of the invention are substances which, on reduction or oxidation at the cathode or anode, give products RED$_2$ and OX, which do not undergo any subsequent chemical reaction, but instead can be fully oxidized or reduced back to OX$_2$ and RED$_1$.
Examples of suitable reducible substances OX$_2$ are
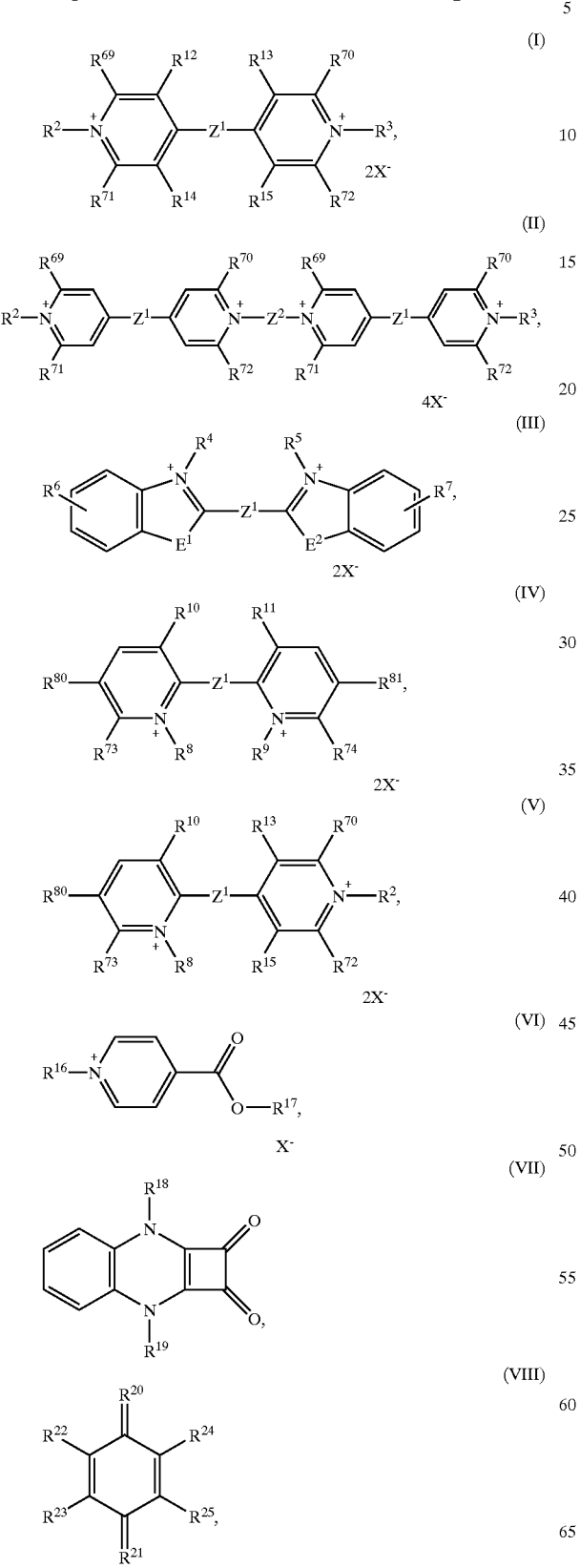
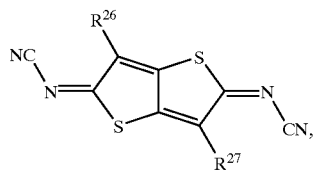
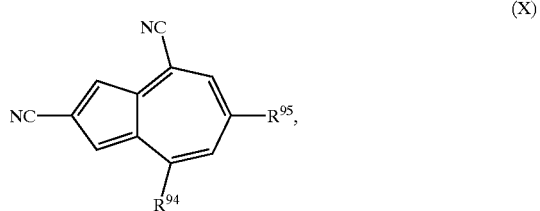
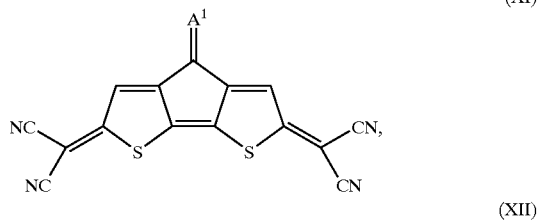
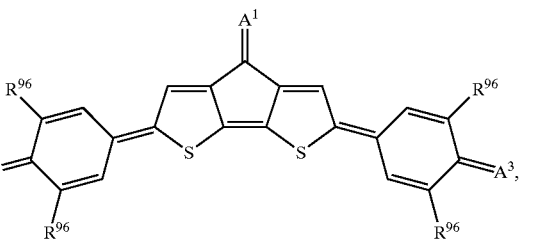
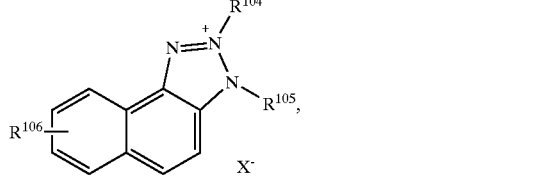

in which

- $R^2$ to $R^5$, $R^8$, $R^9$, $R^{16}$ to $R^{19}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, or
- $R^4$; $R^5$ or $R^8$; $R^9$ together can form a $-(CH_2)_2-$ or $-(CH_2)_3-$ bridge,
- $R^6$, $R^7$ and $R^{22}$ to $R^{25}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or
- $R^{22}$; $R^{23}$ and/or $R^{24}$; $R^{25}$ can form a $-CH=CH-CH=CH-$ bridge, $R^{10}$; $R^{11}$, $R^{10}$; $R^{13}$, $R^{12}$; $R^{13}$ and $R^{14}$; $R^{15}$, independently of one another, are hydrogen or in pairs are a $-(CH_2)_2-$, $-(CH_2)_3-$ or $-CH=CH-$ bridge,
- $R^{20}$ and $R^{21}$, independently of one another, are O, N—CN, $C(CN)_2$ or N—$C_6$- to $C_{10}$-aryl,
- $R^{26}$ and $R^{27}$ are hydrogen, $C_1$- to $C_4$-alkyl, $C_4$-alkoxy, halogen, cyano, nitro, $C_1$- to $C_4$-alkoxycarbonyl or $C_6$- to $C_{10}$-aryl,
- $R^{69}$ to $R^{74}$, $R^{80}$ and $R^{81}$, independently of one another, are hydrogen or $C_1$- to $C_6$-alkyl, or
- $R^{69}$; $R^{12}$, $R^{70}$; $R^{13}$, $R^{73}$; $R^{80}$ and/or $R^{74}$; $R^{81}$ together form a $-CH=CH-CH=CH-$ bridge,
- $E^1$ and $E^2$, independently of one another, are O, S, $NR^1$ or $C(CH_3)_2$, or
- $E^1$ and $E^2$ together form an $-N-(CH_2)_2-N-$ bridge,
- $R^1$ is $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl,
- $Z^1$ is a direct bond, $-CH=CH-$, $-C(CH_3)=CH-$, $-C(CN)=CH-$, $-CCl=CCl-$, $-C(OH)=CH-$, $-CCl=CH-$, $-C\equiv C-$, $-CH=N-N=CH-$, $-C(CH_3)=N-N=C(CH_3)-$ or $-CCl=N-N=CCl-$,
- $Z^2$ is $-(CH_2)_r-$ or $-CH_2-C_6H_4-CH_2-$,
- r is an integer from 1 to 10,
- $R^{94}$ and $R^{95}$, independently of one another, are hydrogen or cyano,
- $R^{101}$ to $R^{105}$, independently of one another, are $C_6$- to $C_{10}$-aryl or an optionally benzo-fused aromatic or quasi-aromatic, five- or six-membered heterocyclic ring,
- $R^{107}$, $R^{109}$, $R^{113}$ and $R^{114}$, independently of one another, are a radical selected from the group consisting of the formulae (CV) to (CVII)

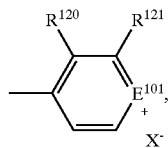

(CV)

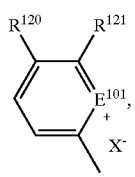

(CVI)

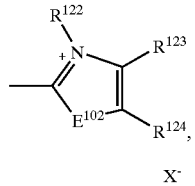

(CVII)

- $R^{108}$, $R^{115}$ and $R^{16}$, independently of one another, are $C_6$- to $C_{10}$-aryl or a radical of the formula (CV),
- $R^{110}$ to $R^{112}$, $R^{117}$ and $R^{118}$, independently of one another, are hydrogen, $C_1$- to $C_4$-alkyl, halogen or cyano,
- $E^{101}$ and $E^{102}$, independently of one another, are O, S or N—$R^{119}$,
- $R^{119}$ and $R^{122}$, independently of one another, are $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl,
- $R^{106}$, $R^{120}$, $R^{121}$, $R^{123}$ and $R^{124}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or
- $R^{120}$, $R^{121}$ or $R^{123}$, $R^{124}$ together form a $-CH=CH-CH=CH-$ bridge,
- $A^1$, $A^2$ and $A^3$, independently of one another, are O or $C(CN)_2$,
- $R^{96}$ is hydrogen, phenyl or tert-butyl, and
- $X^-$ is an anion which is redox-inert under the conditions.

Examples of suitable oxidizable substances $RED_1$ are

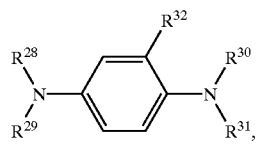

(XX)

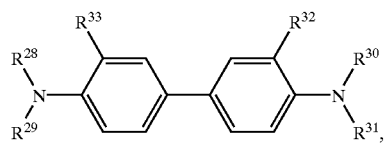

(XXI)

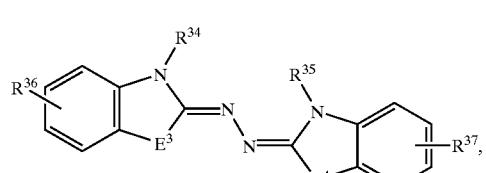

(XXII)

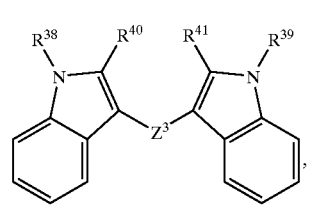

(XXIII)

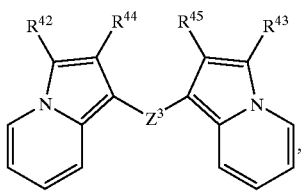
(XXIV)

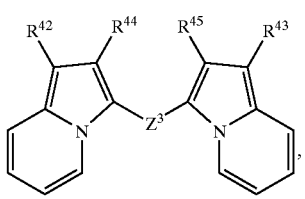
(XXV)

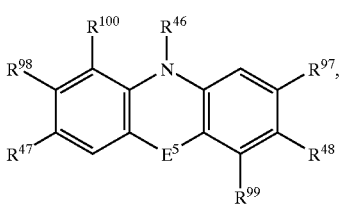
(XXVI)

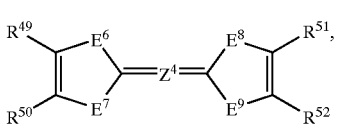
(XXVII)

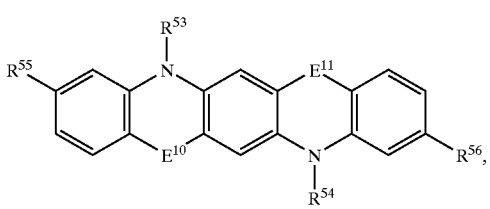
(XXVIII)

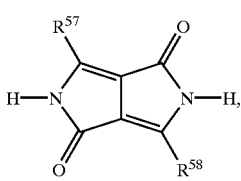
(XXIX)

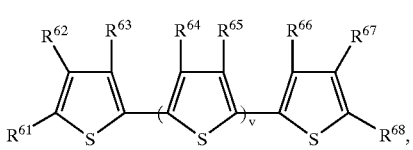
(XXX)

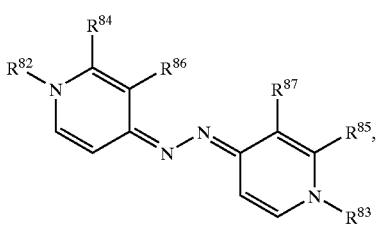
(XXXI)

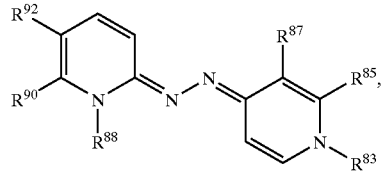
(XXXII)

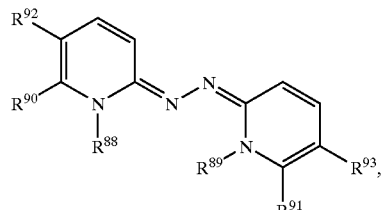
(XXXIII)

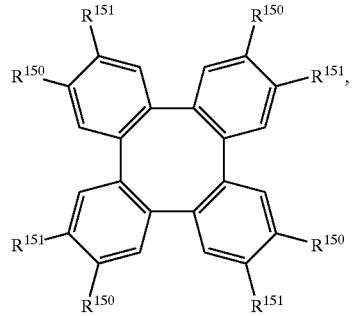
(CL)

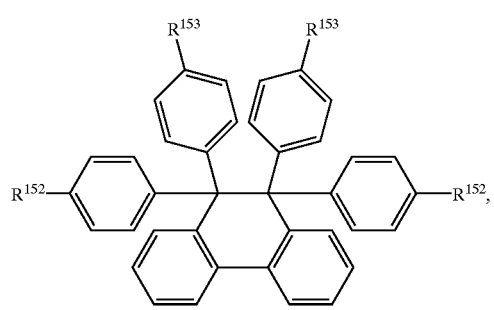
(CLI)

in which $R^{28}$ to $R^{31}$, $R^{34}$ $R^{35}$, $R^{38}$, $R^{39}$ $R^{46}$ $R^{53}$ and $R^{54}$, independently of one another, are $C_1$- to $C_{18}$-alkyl, $C_2$- to $C_{12}$-alkenyl, $C_4$- to $C_7$-cycloalkyl, $C_7$— to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$, $R^{55}$ to $R^{58}$ and $R^{97}$ to $R^{100}$, independently of one another, are hydrogen, $C_1$- to $C_4$-alkyl, $C_1$- to $C_4$-alkoxy, halogen, cyano, nitro, $C_1$- to $C_4$-alkoxycarbonyl, $C_6$- to $C_{10}$-aryl, and $R^{57}$ and $R^{58}$ are additionally an aromatic or quasi-aromatic, five- or six-membered heterocyclic ring which is optionally benzo-fused, and $R^{48}$ is additionally $NR^{75}R^{76}$, or $R^{49}$; $R^{50}$ and/or $R^{51}$; $R^{52}$ form a —(CH$_2$)$_3$—, —(CH$_2$)$_4$—, —(CH$_2$)$_5$— or —CH=CH—CH=CH— bridge, $Z^3$ is a direct bond, a —CH=CH— or —N=N— bridge, =$Z^4$= is a direct double bond, a =CH—CH= or =N—N= bridge, $E^3$ to $E^5$, $E^{10}$ and $E^{11}$, independently of one another, are O, S, $NR^{59}$ or $C(CH_3)_2$, and $E^5$ is additionally C=O or $SO_2$, $E^3$ and $E^4$, independently of one another, can additionally be —CH=CH—, $E^6$ to $E^9$, independently of one another, are S, Se or $NR^{59}$, $R^{59}$, $R^{75}$ and $R^{76}$, independently of one another, are $C_1$- to $C_{12}$-alkyl, $C_2$- to $C_8$-alkenyl, $C_4$- to $C_7$-cycloalkyl, $C_7$- to $C_{15}$-aralkyl, $C_6$- to $C_{10}$-aryl, and $R^{75}$ is additionally hydrogen or $R^{75}$ and $R^{76}$ in the definition of $NR^{75}R^{76}$ are, together with the N atom to which they are attached, a five- or six-membered ring, which optionally contains further heteroatoms, $R^{61}$ to $R^{68}$, independently of one another, are hydrogen, $C_1$- to $C_6$-alkyl, $C_1$- to $C_4$-alkoxy, cyano, $C_1$- to $C_4$-alkoxycarbonyl or $C_6$- to $C_{10}$-aryl, and $R^{61}$; $R^{62}$ and $R^{67}$; $R^{68}$, independently of one another, additionally form a —$(CH_2)_3$—, —$(CH_2)_4$— or —CH=CH—CH=CH— bridge, or $R^{62}$; $R^{63}$, $R^{64}$; $R^{65}$ and $R^{66}$; $R^{67}$ form an —O—$CH_2CH_2$—O— or —O—$CH_2CH_2CH_2$—O— bridge, v is an integer between 0 and 100, $R^{82}$, $R^{83}$, $R^{88}$ and $R^{89}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{84}$ to $R^{87}$ and $R^{90}$ to $R^{93}$, independently of one another, are hydrogen or $C_1$- to $C_6$-alkyl, or $R^{84}$; $R^{86}$, $R^{85}$; $R^{87}$, $R^{90}$; $R^{92}$ and/or $R^{91}$; $R^{93}$ together form a —CH=CH—CH=CH— bridge, $R^{150}$ is hydrogen or $C_1$- to $C_8$-alkoxy, $R^{151}$ and $R^{152}$, independently of one another, are $C_1$- to $C_8$-alkoxy or $C_1$- to $C_8$-dialkylamino, and $R^{153}$ is hydrogen, $C_1$- to $C_8$-alkoxy or $C_1$- to $C_8$-dialkylamino.

Suitable as $RED_1$ are likewise anions, such as $I^-$, $I_3^-$, $Br^-$, $SCN^-$.

Examples of optionally oligomeric or polymeric redox systems linked via a bridge B are those of the formula $$Y-[-(-B-Z-)_a-(-B-Y-)_b-]_c-B-Z \qquad (L),$$

in which

Y and Z, independently of one another, are an $OX_2$ or $RED_1$ radical, where either at least one Y is $OX_2$ and at least one Z is $RED_1$ or Y and Z are $OX_2$, where $OX_2$ is the radical of a reversibly electrochemically reducible redox system, and $RED_1$ is the radical of a reversibly electrochemically oxidizable redox system, B is a bridging unit, c is an integer from 0 to 1000, and a and b, independently of one another, are integers from 0 to 100. (a+b)·c preferably ≦10,000.

The term reversibly electrochemically reducible or oxidizable here is taken to mean that electron transfer can take place with or without a change in the σ structure entirely within the sense of the above-mentioned definition of $OX_2$ and $RED_1$ according to the invention.

The electrochromic compounds of the formula (L) are in particular taken to mean those of the formulae $$OX_2-B-RED_1 \qquad (La),$$

$$OX_2-B-RED_1-B-OX_2 \qquad (Lb),$$

$$RED_1-B-OX_2-B-RED_1 \qquad (Lc),$$

$$OX_2-(B-RED_1-B-OX_2)_d-B-RED_1 \qquad (Ld),$$

$$OX_2-(B-OX_2)_e-B-OX_2 \qquad (Le) \text{ or}$$

$$RED_1-(B-RED_1)_f-B-RED_1 \qquad (Lf)$$

in which $OX_2$, $RED_1$ and B are as defined above, d is an integer from 1 to 5, and e and f, independently of one another, are integers from 0 to 5.

$OX_2$ and $RED_1$ in the formulae (L) and (La) to (Lf) are taken to mean, in particular, radicals of the above-described redox systems of the formulae (I) to (X), (CI) to (CIV) and (XX) to (XXXIII) and of the redox systems according to the invention of the formulae (CC) and (CCI) in which the bonding to the bridging unit B takes place via one of the radicals $R^2$ to $R^{19}$, $R^{22}$ to $R^{27}$, $R^{28}$ to $R^{58}$, $R^{61}$, $R^{62}$, $R^{67}$, $R^{68}$, $R^{83}$, $R^{88}$, $R^{122}$, $R^{201}$ to $R^{207}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, takes place via $R^1$, $R^{59}$ or $R^{119}$, and said radicals are then a direct bond, and B is a bridge of the formulae —$(CH_2)_n$— or —$[Y^1_s(CH_2)_m$—$Y^2]_o(CH_2)_p$—$Y^3_q$—, which may be substituted by $C_1$- to $C_4$alkyl, $C_1$- to $C_4$-alkoxy, halogen or phenyl, $Y^1$ to $Y^3$, independently of one another, are O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$-to $C_{15}$-aralkyl or $C_6$- to $C_{10}$-aryl, n is an integer from 1 to 12, m and p, independently of one another, are integers from 0 to 8, o is an integer from 0 to 6, and q and s, independently of one another, are 0 or 1.

$OX_2$ and $RED_1$ in the formulae (L) and (La) to (Lf) are very particularly taken to mean radicals of the above-described redox systems of the formulae (I), (V), (XX), (XXII), (XXIII), (XXV), (XXVI), (XXXIII), (CC) and (CCI).

In another type of oligomeric or polymeric system, the $OX_2$ and/or $RED_1$ moieties can also be attached to a main group, for example as side chains, for example to a poly (meth)acrylate, silicone, polycarbonate, polyurethane, polyurea, polyester, polyamide, cellulose or other oligomeric or polymeric systems.

Examples of metal salts or metal complexes which can be employed as $OX_2$ or RED, are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3^{0/4-}$, $[Co(CN)_6]^{3-/4-}$, $[Fe(cyclopentadienyl)_2]^{0/+}$, $Lu(Pc)^{2+}$ to $^{2-}$ (Pc= phthalocyanine), $Fe[Fe(CN)_6]^{0/1-}$.

Suitable counterions for metal ions and cationic complexes are all redox-inert anions $X^-$, as described more precisely later, and suitable counterions of the anionic complexes are all redox-inert cations $M^{'+}$, for example alkali metals or quaternary ammonium salts, such as $Na^+$, $K^+$, $N(CH_3)_4^+$, $N(C_4H_9)_4^+$, $C_6H_5CH_2N(CH_3)_3^+$ and others.

The invention furthermore provides electrochromic compounds of the formulae (CC) and (CCI), in which the radicals are as defined above in general, preferred and particularly preferred terms, and electrochromic compounds of the formula (L) in which at least one $OX_2$ corresponds to a radical of the formula (CCI) and/or in which at least one RED$_1$ corresponds to a radical of the formula (CC). Some compounds of the formulae (CC) and (CCl) are already known, but not their electrochromic properties: e.g. J. Chem. Soc. 123 (1923) 2361; J. Chem. Soc. Perkin Trans. I 1974, 1422; Angew. Chem. 103 (1991) 1689; Justus Liebigs Ann. Chem. 609 (1957) 172. The compounds of the formulae (CC) and (CCl) can be prepared in analogy to the processes described in the cited references. The compounds of the formula (L) can be prepared in analogy to the process described in WO 97/30134.

Ions resulting from the synthesis, such as bromide, are subsequently replaced by redox-inert ions.

The invention furthermore provides the use of the compounds of the formulae (CC) and (CCl), in which the radicals are as defined above in general, preferred and particularly preferred terms, and of the compounds of the formula (L) in which at least one OX$_2$ corresponds to a radical of the formula (CCl) and/or in which at least one RED$_1$ corresponds to a radical of the formula (CC) as electrochromic compounds in electrochromic devices.

The invention furthermore provides an electrochromic medium comprising at least one electrochromic substance of one of the formulae (CC) and (CCl) or of the formula (L) in which at least one OX$_2$ corresponds to a radical of the formula (CCl) and/or in which at least one RED$_1$ corresponds to a radical of the formula (CC), in which the radicals are as defined above in general, preferred and particularly preferred terms.

If desired, the electrochromic medium can comprise at least one solvent in which the electrochromic substances, if used a conductive salt and if used further additives are dissolved. The solvent may also be thickened in the form of a gel, for example by polyelectrolytes, porous solids or nanoparticles having large active surface areas. In particular, the electrochromic medium does not contain any solvent when the electrochromic substances obtained are oligomeric or polymeric.

Suitable solvents are all solvents which are redox-inert under the selected voltages and which cannot eliminate electrophiles or nucleophiles or themselves react as sufficiently strong electrophiles or nucleophiles and thus could react with the colored free-radical ions. Examples are propylene carbonate, γ-butyrolactone, acetonitrile, propionitrile, benzonitrile, glutaronitrile, methylglutaronitrile, 3,3'-oxydipropionitrile, hydroxypropionitrile, dimethylformamide, N-methylpyrrolidone, sulfolane, 3-methylsulfolane or mixtures thereof. Preference is given to propylene carbonate, benzonitrile and mixtures with one another or with glutaronitrile or 3-methylsulfolane. Particular preference is given to propylene carbonate. Particular preference is likewise given to benzonitrile.

The electrochromic medium can comprise at least one inert conductive salt. In particular if at least one of the substances of the redox pair RED$_1$/OX$_2$ is of ionic nature, the addition of a conductive salt can be omitted.

Suitable inert conductive salts are lithium, sodium and tetraalkylammonium salts, in particular the latter. The alkyl groups can contain between 1 and 18 carbon atoms and can be identical or different. Preference is given to tetrabutylammonium. Suitable anions for these salts, in particular as anions X$^-$ in the formulae (I) to (VI), (CI), (CII), (CV) to (CVII) and (CCl) and in the metal salts, are all redox-inert, colorless anions.

Examples are tetrafluoroborate, tetraphenylborate, cyanotriphenylborate, tetramethoxyborate, tetrapropoxyborate, tetraphenoxyborate, perchlorate, chloride, nitrate, sulfate, phosphate, methanesulfonate, ethanesulfonate, tetradecanesulfonate, pentadecanesulfonate, trifluoromethanesulfonate, perfluorobutanesulfonate, perfluorooctanesulfonate, benzenesulfonate, chlorobenzenesulfonate, toluenesulfonate, butylbenzenesulfonate, tert-butylbenzenesulfonate, dodecylbenzenesulfonate, trifluoromethylbenzenesulfonate, hexafluorophosphate, hexafluoroarsenate, hexafluorosilicate, 7,8- or 7,9-dicarbanido-undecaborate(-1) or (-2), which are optionally substituted on the B and/or C atoms by one or two methyl, ethyl, butyl or phenyl groups, dodecahydro-dicarbadodecaborate(-2) or B-methyl-C-phenyl-dodecahydro-dicarbadodecaborate(-1).

Likewise suitable are oligomeric or polymeric anions, for example anions of polystyrenesulfonic acid, poly(meth)acrylic acid, polyallylsulfonic acid, polyaspartic acid. X$^-$ is then one equivalent of an oligomeric or polymeric anion of this type.

Likewise suitable, including as anions X$^-$ in the formulae (CCl), (I) to (VI), (CI), (CII) and (CV) to (CVII) and in the metal salts, are the above-mentioned anions which can also take on the role of an RED$_1$, for example I$^-$ and I$_3^-$.

The conductive salts are preferably employed in the range from 0 to about 1 mol/l.

Further additives which can be employed are thickeners in order to control the viscosity of the electro-active solution. This can be of importance for avoiding segregation, i.e. the formation of colored streaks or spots on extended operation of the electrochromic device in the switched-on state, and for controlling the fading rate after the current is switched off.

Suitable thickeners are all compounds customary for this purpose, such as, for example, polyacrylate, polymethacrylate (Luctite L®), polycarbonate or polyurethane.

Suitable further additives for the electrochromic medium for the occasionally desired protection against UV light (<350 nm) are UV absorbers. Examples are UVINUL® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), UVINUL® 3039 (2-ethylhexyl 2-cyano-3,3-diphenylacrylate, BASF), UVINUL® 3088 (2-ethylhexyl p-methoxycinnamate, BASF), CHIMASSORB® 90 (2-hydroxy-4-methoxybenzophenone, Ciba), SANDUVOR® PR-25 (dimethyl 4-methoxybenzylidenemalonate, Clariant).

Preference is given to the five last-mentioned compounds. Preference is likewise given to mixtures of UV absorbers, for example of the four last-mentioned compounds. Particular preference is given to the mixture of UVINUL® 3039 and CHIMASSORB® 90 or SANDUVOR® PR-25 and CHIMASSORB® 90.

Further additives can be yellow filters, such as

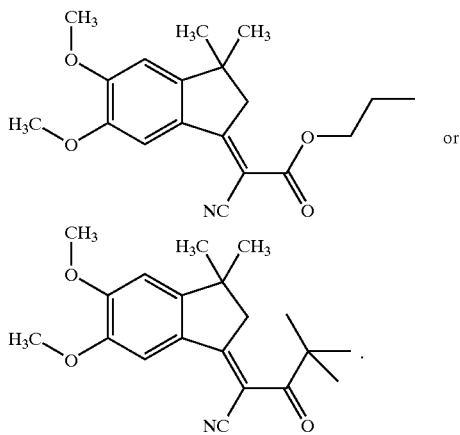

or

These filters absorb radiation between about 350 and about 400 nm.

The UV absorbers and yellow filters are employed in the range from about 0.01 to about 2 mol/l, preferably from about 0.04 to about 1 mol/l.

The electrochromic medium contains each of the electrochromic substances $OX_2$ and $RED_1$ in a concentration of at least $10^{-4}$ mol/l, preferably from about 0.001 to about 0.5 mol/l. The total concentration of all electrochromic substances present is preferably less than about 1 mol/l.

In order to operate the electrochromic device according to the invention, a constant, pulsed or amplitude-varying, for example sinusoidal, current, preferably direct current, is used. The voltage depends on the desired color depth, but in particular on the reduction or oxidation potentials of the $OX_2$ and $RED_1$ used. Such potentials can be found, for example, in Topics in Current Chemistry, Volume 92, pp. 1–44, (1980) or Angew. Chem. 90, 927 (1978) or in the references cited therein. The difference in their potentials is a guide for the requisite voltage, but the electrochromic device can be operated at lower or higher voltage. In many cases, for example when using $OX_2$=formula (I) and $RED_1$=formula (CCa)

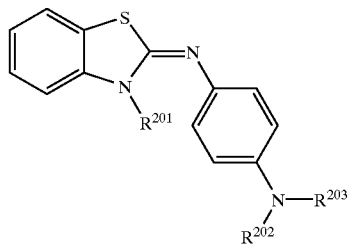

(CCa)

this potential difference necessary for operation is $\leq 1$ V. Such electrochromic devices can therefore be supplied in a simple manner with the current from photovoltaic silicon cells.

When the voltage is switched off, the electrochromic device according to the invention returns to its original state. This erasing can be considerably accelerated if the contacted segments or plates are short-circuited. The display can also be erased very rapidly by repeated reversal of the voltage, optionally also with simultaneous reduction in the voltage.

By varying the layer thickness of the electrochromic device, the viscosity of the electrochromic solution and/or the diffusibility or driftability of the electrochromic substances, the switch-on and switch-off times of the display device can be modified within broad limits. Thus, for example, thin layers exhibit shorter switching times than thick layers. It is thus possible to construct fast- and slow-switchable devices and thus to match them to the particular applications in an optimum manner.

In slow devices, in particular display devices, a power-saving or refresh mode can be used in the switched-on state in order to maintain the displayed information. After the information to be displayed has been built up, for example by direct voltage of sufficient level which is constant or varying with high frequency or pulsed, the voltage is switched to pulsed or varying direct voltage of low frequency, with the contacting of the segments not being short-circuited during the phases in which the voltage is zero. This low frequency can be, for example, in the region of 1 Hz or lower, while the durations of the switch-on and switch-off phases need not be of equal length, but instead, for example, the switch-off phases can be significantly longer. Since the color depth of the displayed information only drops slowly during the current pauses in the non-short-circuited state, relatively short current pulses are sufficient to compensate for these losses again in the subsequent refresh phase. In this way, a flicker-free image with virtually constant color depth is obtained, but its maintenance requires only a fraction of the current that would arise in the case of permanent current flow.

Specific embodiments of the above-mentioned types 1 and 2 can be, for example, the following, which are likewise provided by the invention if they comprise the electrochromic substances according to the invention.

Type 1: (Non-mirrored)

From the light protection/light filter area: window panes for buildings, road vehicles, aircraft, railways, ships, roof glazing, automobile sunroofs, glazing of greenhouses and conservatories, light filters of any desired type; from the security/confidentiality area: separating panes for room dividers in offices, road vehicles, aircraft, railways, sight protection screens at bank counters, door glazing, visors for motorcycle or pilot helmets.

From the design area: glazing of ovens, microwave equipment, other domestic applicances, furniture;

From the display area: analogue voltage displays, as battery testers, tank displays, and temperature displays.

Type 1: (Mirrored)

Mirrors of all types for road vehicles, railways, in particular planar, spherical, aspherical mirrors and combinations thereof, such as spherical/aspherical mirror glazing in furniture.

Type 2

Display devices of all types, segment or matrix displays for watches, computers, electrical equipment, electronic equipment, such as radios, amplifiers, TV sets, CD players, destination displays in buses and trains, departure displays in stations and airports, flat screens, all applications mentioned under types 1 and 2 which contain at least one switchable static or variable display device, such as separating screens containing displays such as "Please do not disturb", "Counter closed", automobile mirrors containing displays of any desired type, such as temperature display, vehicle fault display, for example oil temperature, open doors, time, compass direction.

The invention is further described in the following illustrative examples in which all parts and percentages are by weight unless otherwise indicated.

EXAMPLES

Example 1

A cell was constructed as shown in FIG. 1. To this end, two glass plates 1 and 2 coated on one surface with ITO were used.

A mixture of 97% of photocuring DELO-Katiobond® 4594 epoxy adhesive (DELO Industrieklebstoffe, Landsberg) and 3% of glass beads with a diameter of 600 μm was applied in a ring shape 3 to the ITO-coated side of glass plate 1 in such a way that a 2 mm wide opening 4 was left. Glass plate 2 was then placed on the adhesive bead in such a way that the ITO layers of the two plates 1 and 2 were facing one another and a geometry as shown in FIG. 1 was formed. The adhesive was cured by exposure for 10 minutes to daylight in the vicinity of a window and then for 20 minutes at 105° C. without exposure to light.

A dish was filled under a nitrogen atmosphere with a solution which was 0.02 molar with respect to the electrochromic compound of the formula (CCC):

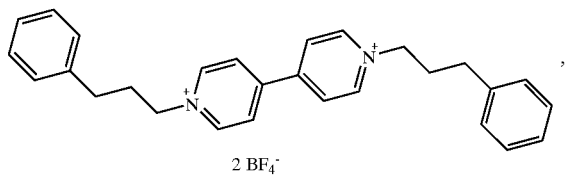

(CCC)

0.02 molar with respect to the electrochromic compound of the formula (CCCl) and (CCCX):

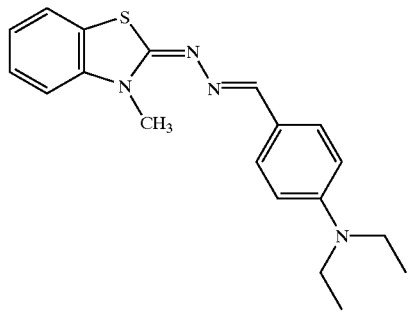

(CCCI)

and 0.05 molar with respect to each of the UV absorbers of the formulae

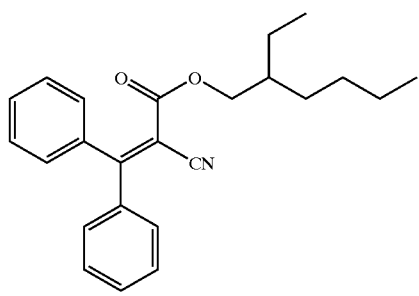

(CCCX)

and

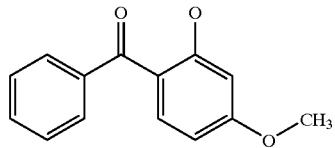

(CCCXI)

in anhydrous, oxygen-free propylene carbonate.

The cell was then placed vertically in the dish under a nitrogen atmosphere in such a way that the opening 4 was located beneath the liquid level. The dish with the cell was placed in a dessicator, which was evacuated to 0.05 mbar and then carefully aerated with nitrogen. During the aeration, the electrochromic solution rose through the opening 4 into the cell and filled the entire volume apart from a small bubble. The cell was removed from the solution.

Alternatively, the cell can be filled with the electrochromic solution under a nitrogen atmosphere with the aid of a fine pipette, the cell being in a vertical position with the opening 4 at the top.

The cell was cleaned at the opening 4 under a nitrogen atmosphere by wiping with a paper towel and sealed with the photochemically curable acrylate adhesive DELO-Photobond® 4497 (DELO Industrieklebstoffe, Landsberg).

The cell was then exposed for 1 minute under a nitrogen atmosphere with a DELOLUX® 03 lamp (DELO Industrieklebstoffe, Landsberg) at a distance of 8 cm from the opening 4, and cured at room temperature overnight under a nitrogen atmosphere.

Application of a voltage of 1.1 V to the conductive layers of plates 1 and 2 caused the cell rapidly to turn dark purple.

Switching off the voltage and short-circuiting the conductive layers caused the color to disappear again within about 30 s.

It was possible to repeat this operation several thousand times.

Very similar results were obtained using the electrochromic substances listed in the table below.

| Example | RED₁ | OX₂ | Color |
|---|---|---|---|
| 2 | [structure: N,N'-dimethyl phenazine] | [structure: 1-benzyl-4-((1-oxo-indan-2-ylidene)methyl)pyridinium BF₄⁻] | yellow |
| 3 | [structure: N-butyl, N'-phenyl phenazine] | [structure: 3-ethyl-2-((1,3-dioxo-indan-2-ylidene)methyl)benzothiazolium BF₄⁻] | greenish yellow |
| 4 | [structure: 3-methyl-2-(4-(diethylamino)phenylimino)benzothiazole] | [structure: 1,1'-bis(3-phenylpropyl)-4,4'-bipyridinium 2BF₄⁻] | brown |
| 5 | [structure: 4-methyl-5-(methylthio)-2-(4-(dimethylamino)phenylimino)-1,3-dithiole] | [structure: cyclic tetrakis(bipyridinium) with phenylpropyl bridges 4BF₄⁻] | red |
| 6 | [structure: 4,5-bis(methoxycarbonyl)-2-(4-(dimethylamino)phenylimino)-1,3-dithiole] | [structure: bis(3-methylthiazolium-2-yl)acrylate ethylene diester with CN groups 2BF₄⁻] | orange |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An electrochromic device comprising:
    (a) a pair of glass plates or a pair of plastic plates or a pair of plastic films, wherein (A) both plates or both films are transparent and at least one plate has a side with a transparent electrically conductive coating that is optionally divisible into separate, individually contacted area segments or (B) (i) one plate or one film is transparent, (ii) the other plate or film is mirrored and (iii) at least one plate or at least one film has a transparent, electrically conductive coating that is optionally divisible into separate, individually contacted area segments and,
    (b) a sealing ring for joining together the plates or the films on the sides having an conductive coating, wherein the two plates or films and the sealing ring form a volume, and (c) an electrochromic medium for filling the volume, wherein the electrochromic medium includes at least one oxidizable electrochromic substance $RED_1$ and at least one reducible electrochromic substance $OX_2$, wherein the substance $RED_1$ is an electrochromic compound of the formula (CC):

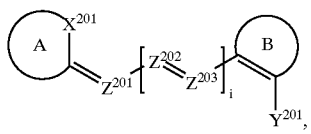

(CC)

wherein

A is an aromatic or a quasi-aromatic, heterocyclic 5- or 6-membered ring in which $X^{201}$ is located in the 2- or 4-position relative to the point of attachment, B is an aromatic or a quasi-aromatic, carbocyclic or heterocyclic 5- or 6-membered ring in which $Y^{201}$ is located in the 2- or 4-position relative to the point of attachment, $X^{201}$ is $NR^{201}$, O or S, $Y^{201}$ is $NR^{202}R^{203}$, $OR^{204}$ or $SR^{205}$, $Z^{201}$ to $Z^{203}$, independently of one another, are carbon or nitrogen, $R^{201}$ to $R^{205}$, independently of one another, are alkyl, alkenyl, cycloalkyl, aralkyl or aryl, and $R^{202}$ to $R^{205}$ may additionally be hydrogen, is an integer from 0 to 3, and $Z^{201}$ to $Z^{203}$ may form a bridge with one another or with the rings A and/or B, and/or the substance $OX_2$ used is an electrochromic compound of the formula (CCI)

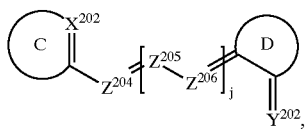

(CCI)

wherein

C is an aromatic or a quasi-aromatic, heterocyclic 5- or 6-membered ring in which $X^{202}$ is located in the 2- or 4-position relative to the point of attachment, D is an aromatic or a quasi-aromatic, carbocyclic or heterocyclic 5- or 6-membered ring in which $Y^{202}$ is located in the 2- or 4-position relative to the point of attachment, or

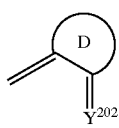

is $=C(CN)_2$, $=C(CN)COOalkyl$ or $=C(COOalkyl)_2$, $X^{202}$ is $N^+R^{206}$, $O^+$ or $S^+$, $Y^{202}$ is $NR^{207}$, O, S, N—CN or $C(CN)_2$, $Z^{204}$ to $Z^{206}$, independently of one another, are carbon or nitrogen, $R^{206}$ and $R^{207}$, independently of one another, are alkyl, alkenyl, cycloalkyl, aralkyl or aryl, j is an integer from 0 to 3, and $Z^{204}$ to $Z^{206}$ may form a bridge with one another or with the rings C and/or D, wherein the rings A, B, C and D may carry further substituents.

2. The electrochromic device according to claim 1, wherein

A is an optionally benzo-fused pyrroline, pyrazoline, imidazoline, triazoline, oxazoline, thiazoline, oxadiazoline, thiadiazoline, dithioline, dihydropyridine, dihydropyrimidine or dihydropyrazine ring, B is an optionally benzo-fused cyclopentadiene or benzene ring, $X^{201}$ is $NR^{201}$, $Y^{201}$ is $NR^{202}R^{203}$, $OR^{204}$ or $SR^{205}$ and is located in the 2- or 4-position relative to the point of attachment, $Z^{201}$ to $Z^{203}$, independently of one another, are carbon or nitrogen, $R^{201}$ to $R^{205}$, independently of one another, are $C_1$- to $C_{12}$-alkyl, $C_3$- to $C_7$-cycloalkyl, $C_7$- to $C_{15}$-aralkyl or $C_6$- to $C_{10}$-aryl, and $R^{202}$ to $R^{205}$ may additionally be hydrogen, i is 0 or 1, and $(Z^{202}=Z^{203})_i$ may be phenylene, C is an optionally benzo-fused pyrrole, pyrazole, imidazole, triazole, oxazole, thiazole, oxadiazole, thiadiazole, dithiol, pyridine, pyrimidine or pyrazine ring, D is an optionally benzo-fused cyclopentene or benzoquinoid ring, or

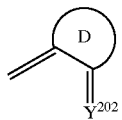

is $=C(CN)_2$, $X^{202}$ is $N^+R^{206}$, $O^+$ or $S^+$, $Y^{202}$ is $NR^{207}$, O, S, N—CN or $C(CN)_2$ and is located in the 2- or 4-position relative to the point of attachment, $Z^{204}$ to $Z^{206}$, independently of one another, are carbon or nitrogen, $R^{206}$ and $R^{207}$, independently of one another, are $C_1$- to $C_{12}$-alkyl, $C_3$- to $C_7$-cycloalkyl, $C_7$- to $C_{15}$-aralkyl or $C_6$- to $C_{10}$-aryl, j is an integer from 0 to 3, and $(Z^{205}=Z^{206})_j$ may be phenylene.

3. The electrochromic device according to claim 1, wherein $X^{201}$ and $Y^{201}$ and $X^{202}$ and $Y^{202}$ are separated by no more than 8 atoms.

4. The electrochromic device according to claim 1, wherein

A is an indoline, benzimidazoline, benzoxazoline, benzthiazoline, 1,3-dithioline, dihydropyridine or dihydroquinoline radical, B is an indene or benzene ring, $X^{201}$ is $NR^{201}$ or S, $Y^{201}$ is $NR^{202}R^{203}$ or $OR^{204}$ and is located in the 2-position relative to the point of attachment when B is an indene ring, and is loacted in the 4-position relative to the point of attachment when B is a benzene ring, $Z^{201}$—$(Z^{202}=Z^{203})_i$ is N, CH, CH—N=N, N—N=CH, CH—CH=CH or N—N=N, $R^{201}$ to $R^{204}$, independently of one another, are methyl, ethyl, propyl, butyl, pentyl, hexyl, heptyl, octyl, cyclohexyl, benzyl, phenethyl, phenylpropyl or phenyl, C is a benzimidazole, benzoxazole, benzthiazole, 1,3-dithiol, pyridine or quinoline ring, D is an indane or benzoquinoid ring, $X^{202}$ is $N^+R^{206}$ or $S^+$, $Y^{202}$ is O, N—CN or $C(CN)_2$, $Z^{204}=(Z^{205}—Z^{206})_j$ is N or CH, and $R^{206}$ is methyl, ethyl, propyl, butyl, pentyl, hexyl, heptyl, octyl, cyclohexyl, benzyl, phenethyl, phenylpropyl or phenyl.

5. The electrochromic device according to claim 1, wherein

A is a radical selected from the group consisting of the formulae

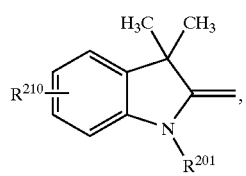 (CCX)

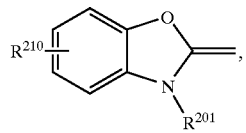 (CCXI)

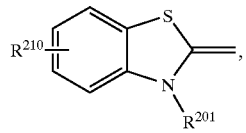 (CCXII)

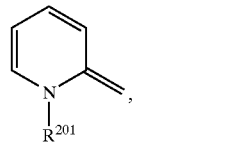 (CCXIII)

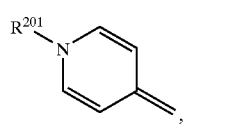 (CCXIV)

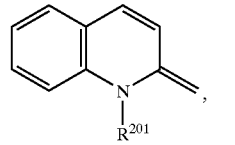 (CCXV)

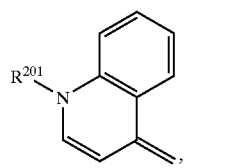 (CCXVI)

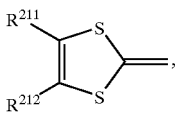 (CCXVII)

B is a radical selected from the group consisting of the formulae

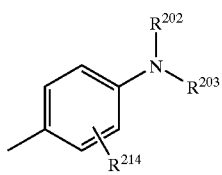 (CCXVIII)

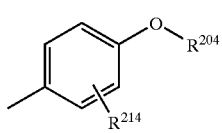 (CCXIX)

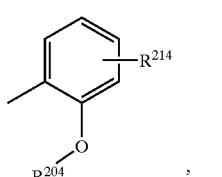 (CCXX)

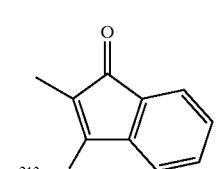 (CCXXI)

$Z^{201}$—$(Z^{202}=Z^{203})_i$ is N, CH, or N—N=CH, $R^{201}$ to $R^{204}$ and $R^{213}$, independently of one another, are methyl, ethyl, propyl, butyl, pentyl, hexyl, heptyl, octyl, cyclohexyl, benzyl, phenethyl, phenylpropyl or phenyl, $R^{210}$ and $R^{214}$, independently of one another, are hydrogen, methyl, ethyl, methoxy, ethoxy, chlorine, $COOCH_3$, $COOC_2H_5$, cyano or nitro, $R^{211}$ and $R^{212}$, independently of one another, are hydrogen, methyl, ethyl, methoxy, ethoxy, methyltho, ethylthio, $COOCH_3$, $COOC_2H_5$ or cyano, or together are a —CH=CH—CH=CH— bridge, C is a radical selected from the group consisting of the formulae

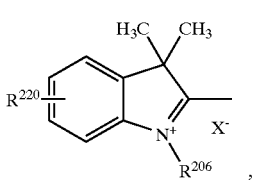 (CCXII)

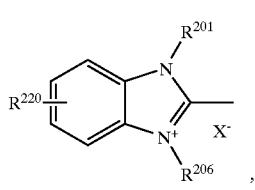 (CCXXIII)
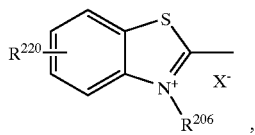 (CCXXIV)
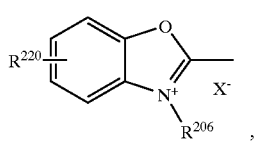 (CCXXV)
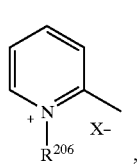 (CCXXVI)
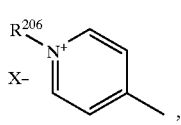 (CCXXVII)
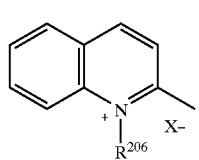 (CCXXVIII)
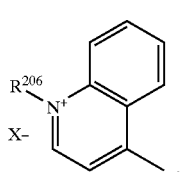 (CCXXIX)
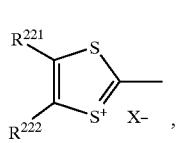 (CCXXX)
D is a radical selected from the group consisting of the formulae
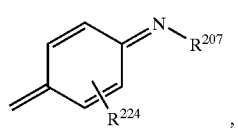 (CCXXXI)
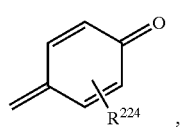 (CCXXXII)
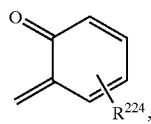 (CCXXXIII)
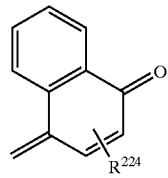 (CCXXXIV)
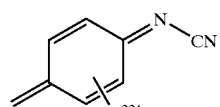 (CCXXXV)
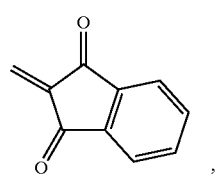 (CCXXXVI)
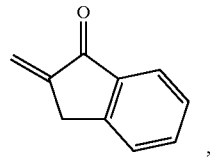 (CCXXXVII)
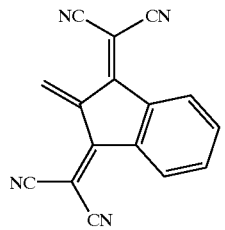 (CCXXXVIII)
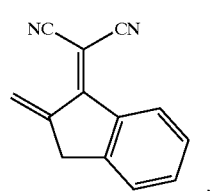 (CCXXXIX)
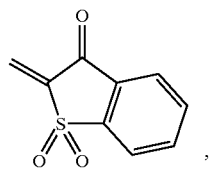 (CCXL)
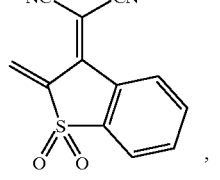 (CCXLI)
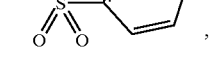

-continued $=C(CN)_2.$ (CCXLII)

$Z^{204}=(Z^{205}-Z^{206})_j$ is N or CH, $R^{206}$ is methyl, ethyl, propyl, butyl, pentyl, hexyl, heptyl, octyl, cyclohexyl, benzyl, phenethyl, phenylpropyl or phenyl, $R^{220}$ and $R^{224}$, independently of one another, are hydrogen, methyl, ethyl, methoxy, ethoxy, chlorine, COOCH$_3$, COOC$_2$H$_5$, cyano or nitro, and $R^{221}$ and $R^{222}$, independently of one another, are hydrogen, methyl, ethyl, methoxy, ethoxy, methylthio, ethylthio, COOCH$_3$, COOC$_2$H$_5$ or cyano or together are a —CH=CH—CH=CH— bridge.

6. An electrochromic compound of the formula (CC):

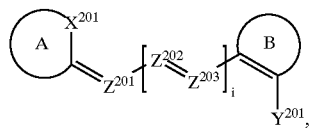
(CC)

A is an aromatic or a quasi-aromatic, heterocyclic 5- or 6-membered ring in which $X^{201}$ is located in the 2- or 4-position relative to the point of attachment, B is an aromatic or a quasi-aromatic, carbocyclic or heterocyclic 5- or 6-membered ring in which $Y^{201}$ is located in the 2- or 4-position relative to the point of attachment, $X^{201}$ is $NR^{201}$, O or S, $Y^{201}$ is $NR^{202}R^{203}$, $OR^{204}$ or $SR^{205}$, $Z^{201}$ to $Z^{203}$, independently of one another, are carbon or nitrogen, $R^{201}$ to $R^{205}$, independently of one another, are alkyl, alkenyl, cycloalkyl, aralkyl or aryl, and $R^{202}$ to $R^{205}$ may additionally be hydrogen, i is an integer from 0 to 3, and $Z^{201}$ to $Z^{203}$ may form a bridge with one another or with the rings A and/or B, wherein A is not be a benzthiazoline radical when $Z^{201}$—$(Z^{202}=Z^{203})_i$ is N—N=CH or N and B is an N,N-disubstituted aniline radical, A is not be a dithiazoline radical when $Z^{201}$—$(Z^{202}=Z^{203})_i$ is N and B is an N,N-disubstituted aniline radical, $Z^{201}$—$(Z^{202}=Z^{203})_i$ is not be CH—N=N, or of the formula (CCl)

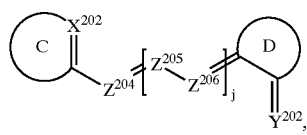
(CCl)

wherein

C is an aromatic or a quasi-aromatic, heterocyclic 5- or 6-membered ring in which $X^{202}$ is located in the 2- or 4-position relative to the point of attachment, D is an aromatic or a quasi-aromatic, carbocyclic or heterocyclic 5- or 6-membered ring in which $Y^{202}$ is located in the 2- or 4-position relative to the point of attachment, or

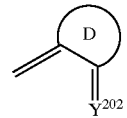

is =C(CN)$_2$, =C(CN)COOalkyl or =C(COOalkyl)$_2$, $X^{202}$ is $N^+R^{206}$, $O^+$ or $S^+$, $Y^{202}$ is $NR^{207}$, O, S, N—CN or C(CN)$_2$, $Z^{204}$ to $Z^{206}$, independently of one another, are carbon or nitrogen, $R^{206}$ and $R^{207}$, independently of one another, are alkyl, alkenyl, cycloalkyl, aralkyl or aryl, j is an integer from 0 to 3, and $Z^{204}$ to $Z^{206}$ may form a bridge with one another or with the rings C and/or D, wherein C is not be a pyridinium radical when $Z^4=(Z^5-Z^6)_j$ is CH and D is an indane-1,3-dion-2-ylidene radical.

7. An electrochromic compound of the formula (L)

$$Y-[-(-B-Z-)_a-(-B-Y-)_b-]_c-B-Z \qquad (L),$$

wherein

Y and Z, independently of one another, are an OX$_2$ or RED$_1$ radical with the proviso that at least one Y is OX$_2$ and at least one Z is RED$_1$ or Y and Z are OX$_2$, wherein OX$_2$ is the radical of a reversibly electrochemically reducible redox system, and RED$_1$ is the radical of a reversibly electrochemically oxidizable redox system, B is a bridging unit, c is an integer from 0 to 1000, and a and b, independently of one another, are integers from 0 to 100, wherein at least one OX$_2$ corresponds to a radical of the formula (CCl) and/or at least one RED$_1$ corresponds to a radical of the formula (CC).

8. An electrochromic medium comprising at least one electrochromic substance of the formulae (CC), (CCl) or (L), wherein formula (CC) is

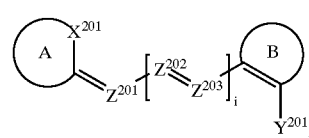
(CC)

wherein

A is an aromatic or a quasi-aromatic, heterocyclic 5- or 6-membered ring in which $X^{201}$ is located in the 2- or 4-position relative to the point of attachment, B is an aromatic or a quasi-aromatic, carbocyclic or heterocyclic 5- or 6-membered ring in which $Y^{201}$ is located in the 2- or 4-position relative to the point of attachment, $X^{201}$ is $NR^{201}$, O or S, $Y^{201}$ is $NR^{202}R^{203}$, $OR^{204}$ or $SR^{205}$, $Z^{201}$ to $Z^{203}$, independently of one another, are carbon or nitrogen, $R^{201}$ to $R^{205}$, independently of one another, are alkyl, alkenyl, cycloalkyl, aralkyl or aryl, and $R^{202}$ to $R^{205}$ may additionally be hydrogen, i is an integer from 0 to 3, and $Z^{201}$ to $Z^{203}$ may form a bridge with one another or with the rings A and/or B, and/or the substance $OX_2$ used is an electrochromic compound of wherein the formula (CCl) is:

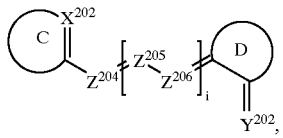  (CCl)

wherein

C is an aromatic or a quasi-aromatic, heterocyclic 5- or 6-membered ring in which $X^{202}$ is located in the 2- or 4-position relative to the point of attachment, D is an aromatic or a quasi-aromatic, carbocyclic or heterocyclic 5- or 6-membered ring in which $Y^{202}$ is located in the 2- or 4-position relative to the point of attachment, or

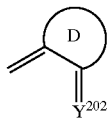

is $=C(CN)_2$, $=C(CN)COOalkyl$ or $=C(COOalkyl)_2$, $X^{202}$ is $N^+R^{206}$, $O^+$ or $S^+$, $Y^{202}$ is $NR^{207}$, O, S, N—CN or $C(CN)_2$, $Z^{204}$ to $Z^{206}$, independently of one another, are carbon or nitrogen, $R^{206}$ and $R^{207}$, independently of one another, are alkyl, alkenyl, cycloalkyl, aralkyl or aryl, j is an integer from 0 to 3, and $Z^{204}$ to $Z^{206}$ can form a bridge with one another or with the rings C and/or D, wherein C is not a pyridinium radical when $Z^4=(Z^5—Z^6)_j$ is CH and D is an indane-1,3-dion-2-ylidene radical, and wherein formula (L) is

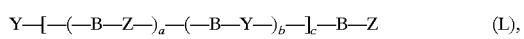  (L), wherein Y and Z, independently of one another, are an $OX_2$ or $RED_1$ radical with the proviso that at least one Y is $OX_2$ and at least one Z is $RED_1$ or Y and Z are $OX_2$, wherein $OX_2$ is the radical of a reversibly electrochemically reducible redox system, and $RED_1$ is the radical of a reversibly electrochemically oxidizable redox system, B is a bridging unit, c is an integer from 0 to 1000, and a and b, independently of one another, are integers from 0 to 100, wherein at least one $OX_2$ corresponds to a radical of the formula (CCl) and/or at least one $RED_1$ corresponds to a radical of the formula (CC).

9. The device of claim 1, wherein the device is a window.

10. The device of claim 1, wherein the device is a screen.

11. The device of claim 1, wherein the device is a separating screen or a sight protection screen.

12. The device of claim 1, wherein the device is a glazing.

13. The device of claim 1, wherein the device is a roof glazing.

14. The device of claim 1, wherein the device is a light filter.

15. The device of claim 1, wherein the device is a mirror.

16. The device of claim 1, wherein the device is a display device.

* * * * *